(12) United States Patent
Rowe et al.

(10) Patent No.: US 8,156,428 B1
(45) Date of Patent: Apr. 10, 2012

(54) METHOD AND APPARATUS FOR MERGING DIGITAL CONTENT

(75) Inventors: Edward R. Rowe, Sunnyvale, CA (US); Brent E. Rosenquist, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 735 days.

(21) Appl. No.: 11/066,976

(22) Filed: Feb. 25, 2005

(51) Int. Cl.
*G06N 3/00* (2006.01)

(52) U.S. Cl. ........................................................ 715/255

(58) Field of Classification Search .................. 715/513, 715/517, 523, 530, 234, 244, 254, 243, 255
See application file for complete search history.

(56) References Cited

U.S. PATENT DOCUMENTS

| | | | |
|---|---|---|---|
| 6,415,278 B1 * | 7/2002 | Sweet et al. | 707/2 |
| 6,567,799 B2 | 5/2003 | Sweet et al. | |
| 6,789,080 B1 | 9/2004 | Sweet et al. | |
| 7,630,092 B1 * | 12/2009 | Suzuki et al. | 358/1.14 |
| 2001/0032137 A1 * | 10/2001 | Bennett et al. | 705/14 |
| 2003/0225644 A1 * | 12/2003 | Casati et al. | 705/35 |
| 2004/0143508 A1 * | 7/2004 | Bohn et al. | 705/26 |
| 2004/0230886 A1 * | 11/2004 | Livshits | 715/500 |

OTHER PUBLICATIONS

Camarda, "Special Edition Using Microsoft(r) Word 2002," Que, Chapter 18.*
Acklen et al., "Special Edition Using Corel(r) WordPerfect(r) 10," Dec. 13, 2001, Que, pp. 517-524.*

* cited by examiner

*Primary Examiner* — Kyle Stork
(74) *Attorney, Agent, or Firm* — Robert C. Kowert; Meyertons, Hood, Kivlin, Kowert & Goetzel, P.C.

(57) ABSTRACT

Embodiments for merging digital content are disclosed.

26 Claims, 6 Drawing Sheets

METHOD AND APPARATUS FOR MERGING DIGITAL CONTENT

FIELD

This application pertains to the field of digital media, and more particularly, to the field of merging digital content.

BACKGROUND

Users of electronic devices such as computers sometimes desire to merge digital content such as a web page into another digital content such as a word processing document. This is sometimes accomplished by a user selecting a link (for example, a hypertext link) within a current document, and in response to the selection of the link a software agent retrieves a digital content and merges it with the current document. An example may be found in U.S. Pat. No. 6,415,278.

BRIEF DESCRIPTION OF THE DRAWINGS

The claimed subject matter will be understood more fully from the detailed description given below and from the accompanying drawings of embodiments which should not be taken to limit claimed subject matter to the specific embodiments described, but are for explanation and understanding only.

DETAILED DESCRIPTION

Figure 1:
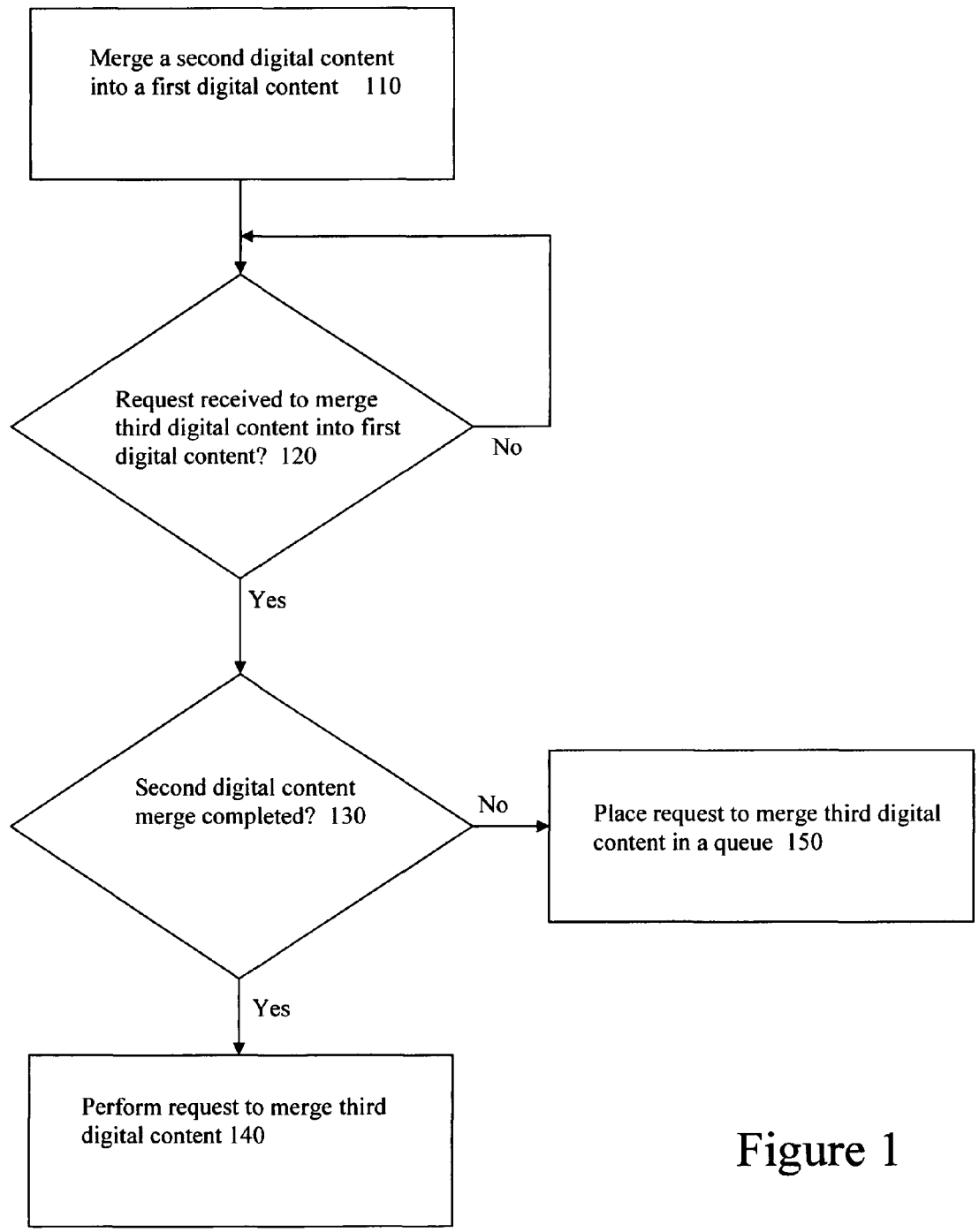
FIG. 1 is a flow diagram of an example embodiment for merging digital content.

FIG. 1 is a flow diagram of an example embodiment for merging digital content. As used herein, the term "digital content" is meant to include a wide range of content types that may be represented in a digital format. Examples of digital content include, but are not limited to, text files, word processor documents, video clips, digital photographs, bitmaps, audio files, etc. Documents that may be accessed via the World Wide Web are additional examples of digital content.

At block 110, a second digital content is merged into a first digital content. The merge operation may include a wide range of possible techniques for merging the second digital content into the first digital content. In one embodiment, the second digital content is appended to the end of the first digital content. Further, in one embodiment, the merge operation may include converting the second digital content from one format to another format that is consistent with the first digital content.

Digital content may reside locally within a computer system or may be distributed over a network. For example, digital content may be retrieved from a remote server via the Internet.

At block 120, a determination is made as to whether a request has been received to merge a third digital content into the first digital content. If such a request is received, processing continues at block 130.

A determination is made at block 130 as to whether the second digital content has been merged with the first digital content. If the second digital content merge operation has completed, a merge operation for the third digital content is initiated, as indicated at block 140. However, if the second digital content merge operation has not yet completed, at block 150 the request to merge the third digital content is placed in a queue for later processing. As used herein, the term "completed" in association with a merge operation or request is meant to indicate that the associated merge operation or request has progressed at least to a point where a subsequent merge operation may begin.

By allowing the third digital content merge request to be placed in a queue for later processing, a user initiating the third digital content merge request does not need to wait for the second digital content merge operation to complete before initiating the third digital content merge request.

As used herein, the term "queue" is meant to include any circuit, device, or technique for maintaining an operation request for later completion.

Figure 2:
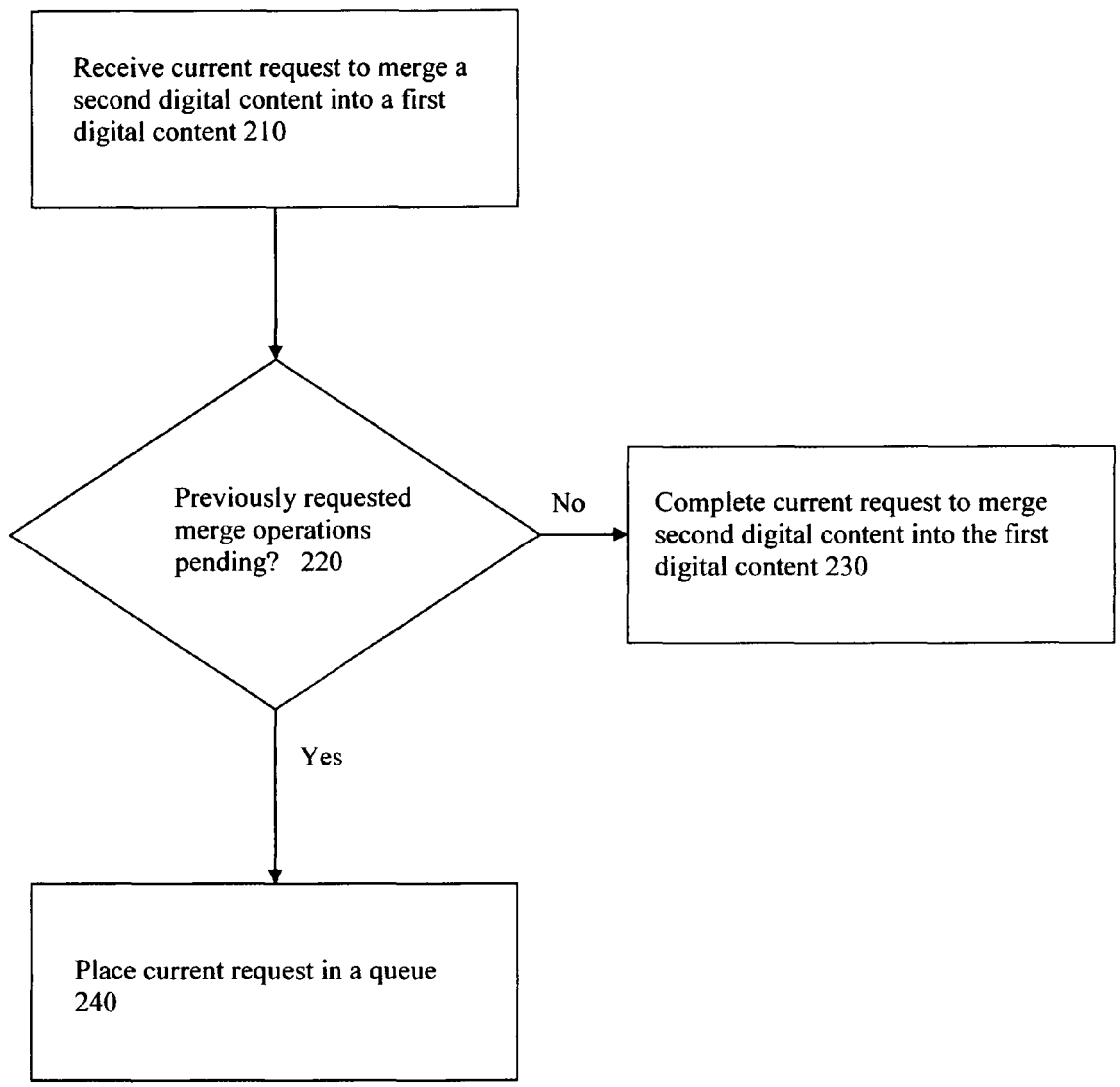
FIG. 2 is a flow diagram of an example embodiment for merging digital content.

FIG. 2 is a flow diagram of an example embodiment for merging digital content. At block 210, a current request is received to merge a second digital content into a first digital content. A determination is made at block 220 as to whether there are previously requested merge operations pending. For this example embodiment, the previously requested merge operations may relate to the first digital content. If no previously requested merge operations are pending, at block 230 the current request to merge the second digital content into the first digital content is completed. If at block 220 the determination is made that one or more previously requested merge operations are pending, at block 240 the current request to merge the second digital content into the first digital content is placed in a queue to be processed after one or more previously requested merge operations are completed.

Although the example embodiment discussed above in connection with FIG. 2 discloses that the current request is placed in a queue until the previously requested merge operations are complete, other embodiments are possible that may provide for a user to rearrange the order in which the current and previously requested merge operations are to be completed. For example, the current request may be given higher priority over the previously requested merge operation requests.

Figure 3:
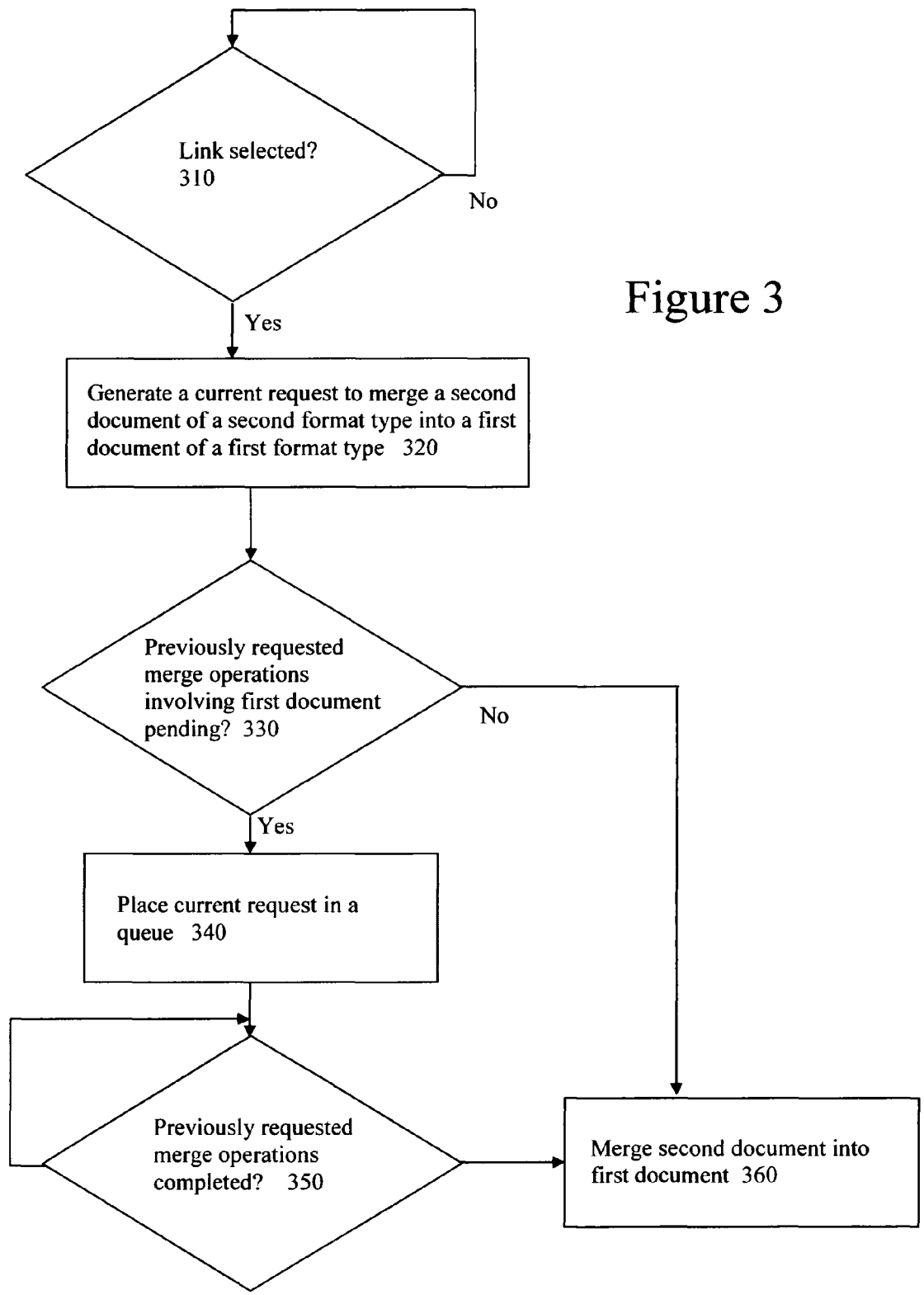
FIG. 3 is a flow diagram of an example embodiment for merging digital content.

FIG. 3 is a flow diagram of an example embodiment for merging digital content. Block 310 indicates that if a link is selected, a current request is generated at block 320 to merge a second document of a second format type into a first document of a first format type. The link for this example embodiment may comprise a reference to another document or other type of digital content. One possible type of link may comprise a hypertext link. In this and in other embodiments, a link may be selected using any method, including, but not limited to, a user placing a cursor over a link and pressing and releasing a button or tapping on some other surface on a mouse or other type of pointing device while the cursor is over the link. Another method may include a user placing a cursor over the link.

At block 330, a determination is made as to whether one or more previously requested merge operations involving the first document are pending. If not, at block 360 the second document is merged into the first document. If a determination is made that there is one or more pending merge operations involving the first document, at block 340 the current request is placed in a queue.

At block 350, a determination is made as to whether the previously requested merge operation or operations have completed. If the previously requested merge operation or operations have completed, at block 360 the current request is completed and the second document is merged into the first document.

As mentioned above, for this example embodiment the first document and the second document may comprise differing formats. For example, the first document may comprise a physical markup format and the second document may comprise a semantic markup format. A markup language may be a set of codes or tags which may be embedded within a document to describe how the document should be displayed on a display device. With physical markup document formats, the document layout may be fixed. Some physical markup document formats may have paginated representations that may include pages having a respective physical width and physical height. Also, font sizes may be fixed. Some physical markup document formations may lack pagination. Semantic markup formats may lack fixed document formats. Semantic markup formats may also lack fixed page dimensions and may also lack pagination information, but may identify some characteristics of a document including line spacing or font size. The precise manner in which these characteristics are to be displayed for semantic markup documents may be left to a software agent, such as a web browser.

Many of the documents accessible on the World Wide Web are encoded using a semantic markup language known as the Hypertext Markup Language (HTML). HTML is merely one example of a semantic markup language. Extensible Markup Language (XML) comprises another example of a semantic markup language. One example of a physical markup representation comprises portable document format (PDF) files.

To merge the second document of a second format type into a first document of a first format type, a conversion from one format to the other may take place. For example, one embodiment may convert a semantic markup format document into a physical markup format to be incorporated into a physical markup document.

For one embodiment, converting from a semantic markup document to a physical markup document may include parsing a semantic markup document and loading the parsed semantic information into data structures that may be stored in a computer memory. The data structures may then be processed with a layout method. The layout method may use a set of rules and/or heuristics to process the data structures that represent the semantic information and produce another set of data structures that represent a physical markup format. For one embodiment, the layout rules may include the page size of the target physical markup document as well as font types and font colors.

For these and other embodiments, a user may select the links that the user desires to download and merge, and the software agent and/or hardware works on them in the order of request. The user may also subsequently adjust the order of requests within the queue.

Figure 4:
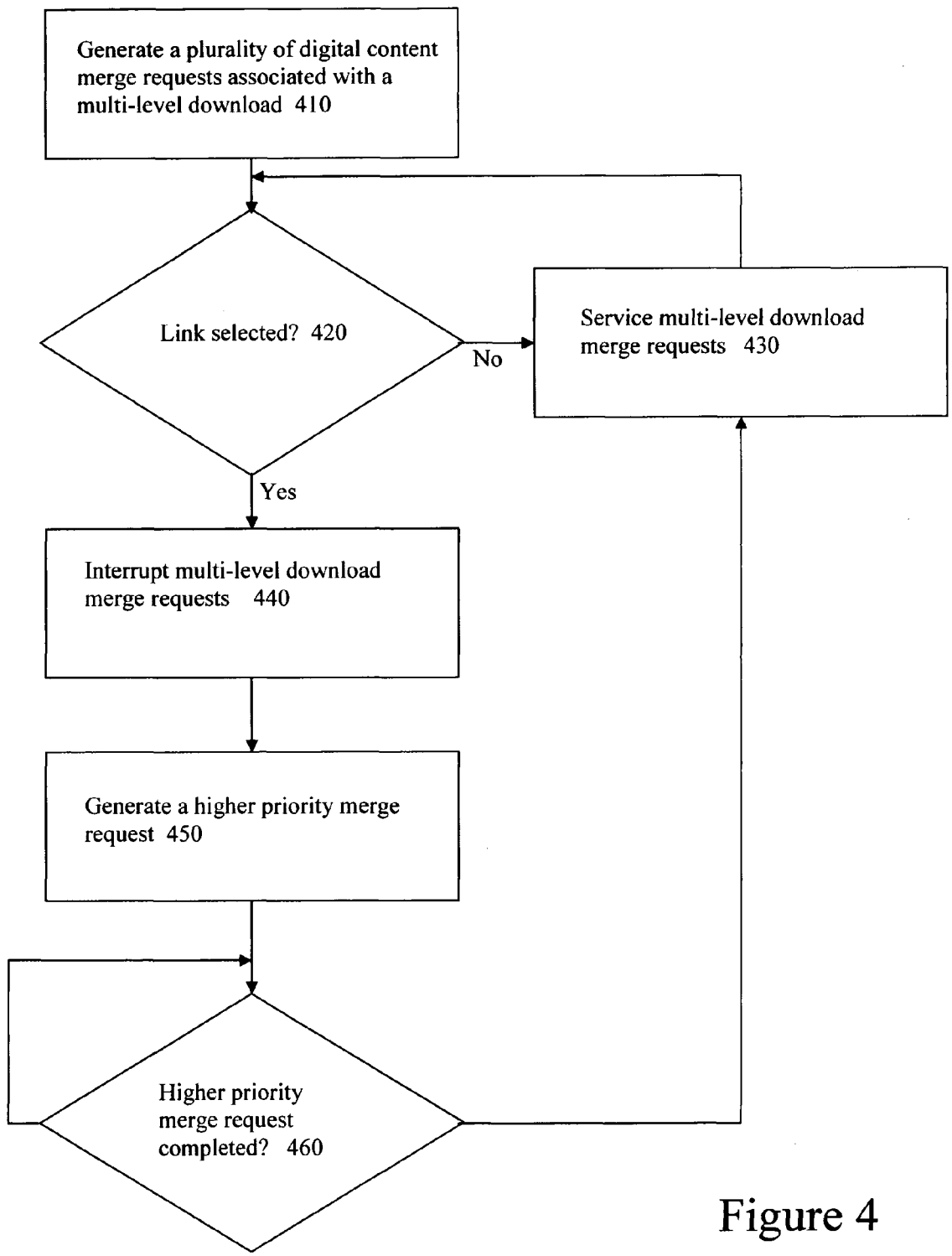
FIG. 4 is a flow diagram of an example embodiment for merging digital content.

FIG. 4 is a flow diagram of an example embodiment for merging digital content. At block 410, a plurality of digital content merge requests are generated. The plurality of requests for this example embodiment may be associated with a multi-level download. One example of a multi-level download includes selecting a link on a web page or a link embedded in some other document. The link may refer to a document that in turn includes links to other documents, and merge operation requests may be initiated for these linked documents. A multi-level download may also retrieve and merge a subset of the linked documents. For example, one embodiment may retrieve linked documents that share a directory path with an original document, but ignore other linked documents that fall outside of that directory path. Other embodiments may include multi-level downloads that retrieve documents associated with a hostname indicated by a link. As used herein, the term "hostname" is meant to include any device, technique, or method for identifying a computer. Still other embodiments may include multi-level downloads that retrieve documents that are associated with a specified regular expression. In this context, a regular expression is any way to specify, match, and replace patterns in text. In one embodiment, a regular expression is represented as a string that comprises characters and is used to find or match patterns of characters in a second string. Other embodiments may use other criteria to include documents in a multi-level download.

At block 420, a determination is made as to whether a link has been selected by a user subsequent to the generation of the plurality of requests associated with the multi-level download. If no link has been selected, at block 430 the multi-level download merge requests continue to be serviced. After a link is selected, at block 440 the multi-level download merge requests are interrupted. At block 450 a higher priority merge request is generated. This merge request may seek to retrieve a document referred to by the selected link. Block 460 indicates that once the higher priority merge request has completed, processing returns to block 430 and the multi-level download merge requests are serviced. Thus, a multi-level download may be interrupted in this example embodiment by a user selecting a link indicating that the user desires to retrieve a document associated with the link. The multi-level download resumes when the document referred to by the user-selected link has completed its merge operation.

Figure 5:
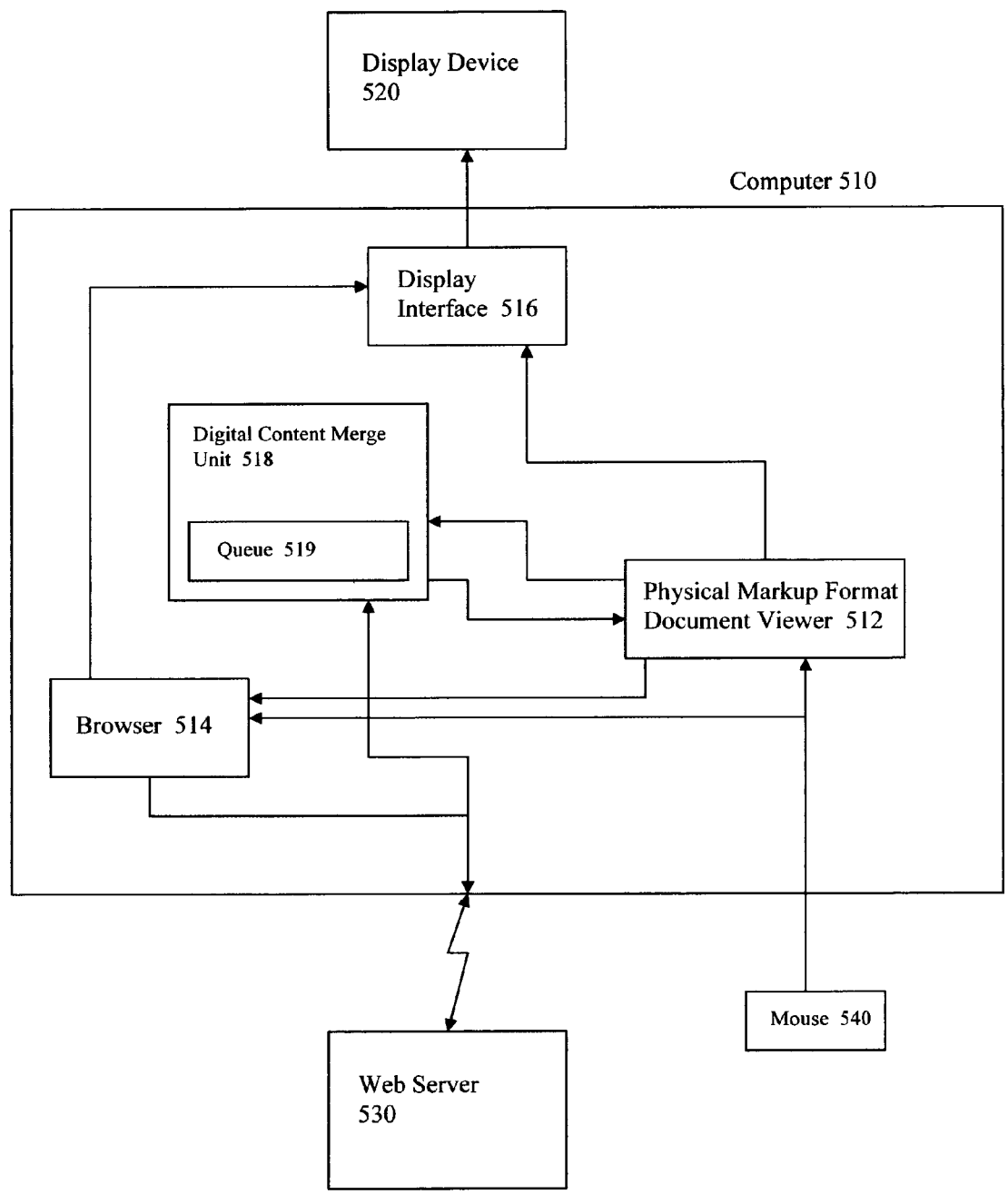
FIG. 5 is a block diagram of an embodiment of an example computer system.

FIG. 5 is a block diagram of an embodiment of an example computer system 500. System 500 includes a computer 510. Computer 510 includes a display interface 516 coupled to a display device 520. Computer 510 is further coupled via a communications link to a web server 530 for this example embodiment. Computer 510 also includes a physical markup format document viewer 512, a browser 514, and a digital content merge unit 518. Digital content merge unit 518 includes a queue 519. Physical markup format document viewer 512, browser 514, and digital content merge unit 518 may be implemented either in software, firmware, hardware, or in a combination of hardware, firmware, and software.

The physical markup document which is being displayed by physical markup format document viewer 512 may have links to web pages, as well as to internal pages within the physical markup format document. After a user selects a link in the physical markup format document with a mouse 540, if the link refers to a page within the physical markup format document, then that page is displayed by viewer 512. If the link is to a web page, that page is either displayed by browser 514 or merged into the physical markup format document by digital content merge unit 518, depending at least in part on which mode is selected by the user. A web page may comprise a document on the World Wide Web, and a web page may have a unique Uniform Resource Locator (URL).

For the first merge request initiated by the selection of a link, the request may be operated on without significant delay. Subsequent link selections may result in merge requests placed in queue 519 if previous merge requests are pending. In this manner, the user need not wait until one merge request completes before being able to initiate other merge requests via the selection of additional links. This allows the user to work more efficiently.

Digital content merge unit 518 may be implemented as part of viewer 512. In one embodiment, viewer 512 comprises a PDF viewer and browser 514 comprises a web browser. Other embodiments are possible using other computer system configurations.

For this embodiment, when a second document is merged with a first document, the second document may be appended to the end of the first document. Other embodiments may allow the user to specify that the second document be placed at other locations within the first document. Further, other embodiments are possible where the user may rearrange the order of merge requests within the queue when multiple merge requests are pending.

Figure 6:
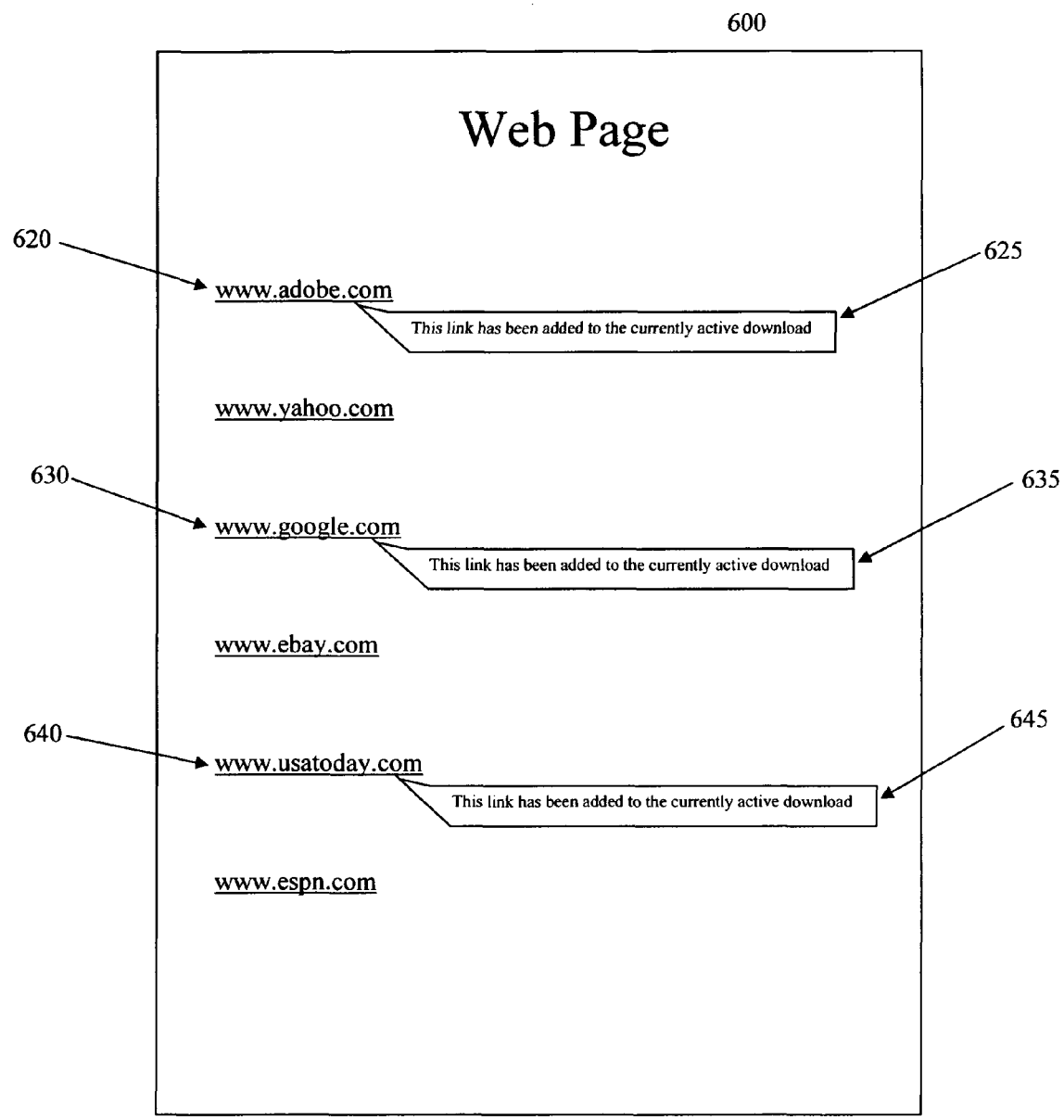
FIG. 6 is a representation of an example digital content including links to other digital content.

FIG. 6 is a representation of an example digital content including links to other digital content. FIG. 6 depicts an example web page 600, including a number of links. For this example embodiment, after a user selects a link for merging into a document, a visual indication is given to indicate that the selected link has been added to the download and merge queue. For example, visual indication 625 indicates that link 620 has been selected and a request has been added to the queue. Similarly, visual indications 635 and 645 indicate that links 630 and 640 have been selected and that requests have been added to the queue. After the download and merge operations for a link have completed, the associated visual indication is removed.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification claimed subject matter has been described with reference to specific example embodiments thereof. It will, however, be evident that various modifications and/or changes may be made thereto without departing from the broader spirit and/or scope of the subject matter as set forth in the appended claims. The specification and/or drawings are, accordingly, to be regarded in an illustrative rather than in a restrictive sense.

What is claimed is:

1. A method, comprising:
   merging a second digital content into a first digital content at least in part in response to user input which indicates selection of a first hypertext link contained in the first digital content, wherein the first hypertext link identifies the second digital content, the first digital content displayed by a software agent executed by a processor, wherein said merging the second digital content into the first digital content is performed by the processor;
   subsequent to starting said merging and prior to completion of said merging:
      receiving a request at the processor to merge a third digital content into the first digital content, wherein the request is generated at least in part in response to additional user input which indicates selection of an additional hypertext link contained in the first digital content, the additional hypertext link identifying the third digital content, wherein the additional user input which indicates selection of the additional hypertext link is received subsequent to the user input which indicates selection of the first hypertext link; and
      placing the request in a queue in a memory, wherein the queue is configured to store the request to merge the third digital content into the first digital content while the second digital content is being merged into the first digital content; and
      merging the third digital content into the first digital content, wherein when said merging the second digital content into the first digital content is completed and when said merging the third digital content into the first digital content is completed, the first digital content comprises the second digital content and the third digital content.

2. The method of claim 1, wherein the first digital content comprises a physical markup document.

3. The method of claim 2, wherein the second digital content comprises a semantic markup document.

4. The method of claim 3, wherein the physical markup document comprises a portable document file.

5. The method of claim 4, wherein the semantic markup document comprises a hypertext markup language document.

6. A method, comprising:
   generating a request to merge a second document of a second format type into a first document of a first format type at least in part in response to receiving user input which indicates selection of a first hypertext link contained in the first document, wherein the first hypertext link identifies the second document, the first document displayed by a software agent executed by a processor;
   determining whether any other previously requested merge operations are in progress for the first document when the user input is received;
   in response to determining that no other previously requested merge operations are in progress for the first document when the user input is received:
      merging the second document into the first document, wherein said merging the second document into the first document is performed by the processor;
   repeating said generating and said determining for another request to merge another document into the first document, wherein said generating is repeated at least in part in response to receiving another user input which indicates selection of another hypertext link contained in the first document, wherein the another hypertext link identifies the another document, wherein the another user input which indicates selection of another hypertext link is received subsequent to the user input which indicates selection of the first hypertext link;
   in response to determining that said merging the second document into the first document is in progress when the another user input is received:
      placing the another request in a queue in a memory, wherein the queue is configured to store the another request to merge the another document into the first document while the second document is being merged into the first document; and
   merging the another document into the first document, wherein when said merging the second document into the first document is complete and when said merging the another document into the first document is complete, the first document comprises the second document and the another document.

7. The method of claim 6, further comprising providing a visual indicator, via a display, that one or more of the first and another hypertext links have been selected.

8. A method of merging digital content, comprising:
   receiving user input which indicates selection of a hypertext link contained in a document, wherein the hypertext link identifies a first digital content;
   in response to the received user input, merging the first digital content into the document;
   subsequent to starting said merging and prior to completion of said merging, receiving additional user input which indicates selection of one or more respective hypertext links contained in the document, wherein each of the one or more respective hypertext links identifies a corresponding digital content, wherein the one or more respective hypertext links are selected in a selection order, and wherein the additional user input which indicates selection of the one or more respective hypertext links is received subsequent to the user input which indicates selection of the hypertext link;

in response to the received additional user input, maintaining a queue of a selection order of the one or more respective hypertext links and merging each corresponding digital content into the document according to the selection order; and wherein when said merging each corresponding digital content into the document is complete, the document comprises all of the merged digital content.

9. The method of claim 8, further comprising receiving user input which indicates a request to modify the order in which the digital content are to be merged.

10. The method of claim 8, wherein the first digital content and the corresponding digital content comprise one or more of a physical markup format document, a semantic markup format document, a digital photograph file, a word processor document, a spreadsheet file, an audio file, a video file, and/or a bitmap file.

11. An article, comprising:
a tangible computer storage medium having stored thereon instructions executable by a computing platform to:
merge a second digital content into a first digital content at least in part in response to user input which indicates selection of a first hypertext link contained in the first digital content, wherein the first hypertext link identifies the second digital content;
subsequent to starting said merging and prior to completion of said merging:
receive a request to merge a third digital content into the first digital content, the request generated at least in part in response to additional user input which indicates selection of an additional hypertext link contained in the first digital content, the additional hypertext link identifying the third digital content, wherein the additional user input which indicates selection of the additional hypertext link is received subsequent to the user input which indicates selection of the first hypertext link; and
place the request in a queue, wherein the queue is configured to store the request to merge the third digital content into the first digital content while the second digital content is being merged into the first digital content; and
merge the third digital content into the first digital content, wherein when said merging the second digital content into the first digital content is completed and when said merging the third digital content into the first digital content is completed, the first digital content comprises the second digital content and the third digital content.

12. The article of claim 11, wherein the first digital content comprises a physical markup document.

13. The article of claim 12, wherein the second digital content comprises a semantic markup document.

14. The article of claim 12, wherein the physical markup document comprises a portable document file.

15. The article of claim 13, wherein the semantic markup document comprises a hypertext markup language document.

16. An article, comprising:
a tangible computer storage medium having stored thereon instructions executable by a computing platform to:
generate a request to merge a second document of a second format type into a first document of a first format type at least in part in response to receiving user input which indicates selection of a first hypertext link contained in the first document, wherein the first hypertext link identifies the second document;
determine whether any other previously requested merge operations are in progress for the first document when the user input is received;
in response to determining that no other previously requested merge operations are in progress for the first document when the user input is received:
merge the second document into the first document;
repeat said generating and said determining for another request to merge another document into the first document, wherein said generating is repeated at least in part in response to receiving another user input which indicates selection of another hypertext link contained in the first document, wherein the another hypertext link identifies the another document, wherein the another user input which indicates selection of another hypertext link is received subsequent to the user input which indicates selection of the first hypertext link;
in response to determining that said merging the second document into the first document is in progress when the another user input is received:
place the another request in a queue, wherein the queue is configured to store the another request to merge the another document into the first document while the second document is being merged into the first document; and
merge the another document into the first document, wherein when said merging the second document into the first document is complete and when said merging the another document into the first document is complete, the first document comprises the second document and the another document.

17. The article of claim 16, wherein the tangible computer storage medium has stored thereon further instructions executable by the computing platform to provide a visual indicator that one or more of the first and another hypertext links have been selected.

18. An article, comprising:
a tangible computer storage medium having stored thereon instructions executable by a computing platform to:
receive user input which indicates selection of a hypertext link contained in a document, wherein the hypertext link identifies a first digital content;
in response to the received user input, merge the first digital content into the document;
subsequent to starting said merging and prior to completion of said merging, receive additional user input which indicates selection of one or more respective hypertext links contained in the document, wherein each of the one or more respective hypertext links identifies a corresponding digital content, wherein the one or more respective hypertext links are selected in a selection order, and wherein the additional user input which indicates selection of the one or more respective hypertext links is received subsequent to the user input which indicates selection of the hypertext link; and
in response to the received additional user input, maintain a queue of a selection order of the one or more respective hypertext links and merge each corresponding digital content into the document according to the selection order; and wherein when said merging each corresponding digital content into the document is complete, the document comprises all of the merged digital content.

19. The article of claim 18, wherein the tangible computer storage medium has stored thereon further instructions executable by the computing platform to merge each corresponding digital content into the document according to the selection order of the respective hypertext links by maintaining a queue of the selection order.

20. The article of claim 18, wherein said tangible computer storage medium has stored thereon further instructions executable by the computing platform to receive user input which indicates a request to modify the order in which the digital content are to be merged.

21. The article of claim 18, wherein the first digital content and the corresponding digital content comprise one or more of a physical markup format document, a semantic markup format document, a digital photograph file, a word processor document, a spreadsheet file, an audio file, a video file, and/or a bitmap file.

22. An apparatus, comprising:
    means for merging a second digital content into a first digital content at least in part in response to user input which indicates selection of a first hypertext link contained in the first digital content, wherein the first hypertext link identifies the second digital content;
    means for storing merge requests;
    means for, subsequent to starting said merging and prior to completion of said merging:
        receiving a request to merge a third digital content into the first digital content, wherein the request is generated at least in part in response to additional user input which indicates selection of an additional hypertext link contained in the first digital content, the additional hypertext link identifying the third digital content, wherein the additional user input which indicates selection of the additional hypertext link is received subsequent to the user input which indicates selection of the first hypertext link; and
        placing the request in a queue in said means for storing merge requests, wherein the queue is configured to store the request to merge the third digital content into the first digital content while the second digital content is being merged into the first digital content; and
    means for merging the third digital content into the first digital content, wherein when said merging the second digital content into the first digital content is completed and when said merging the third digital content into the first digital content is completed, the first digital content comprises the second digital content and the third digital content.

23. The apparatus of claim 22, wherein the first digital content comprises a physical markup document.

24. The apparatus of claim 23, wherein the second digital content comprises a semantic markup document.

25. A method, comprising:
    merging contents of a first web page into a first document using a digital content merge unit of a computing system at least in part in response to user input which indicates selection of a first hypertext link contained in the first document, wherein the first hypertext link identifies the first web page via a uniform resource locator;
    subsequent to starting said merging and prior to completion of said merging:
        receiving a request to merge contents of a second web page into the first document, wherein the request is generated at least in part in response to additional user input which indicates selection of a second hypertext link contained in the first document, the second hypertext link identifying the second web page via a second uniform resource locator, wherein the additional user input which indicates selection of the second hypertext link is received subsequent to the user input which indicates selection of the first hypertext link; and
        placing the request in a queue of the computing system, wherein the queue is configured to store the request to merge the contents of the second web page into the first document while the contents of the first web page are being merged into the first document; and
    merging the contents of the second web page into the first document, wherein when said merging the contents of the first web page into the first document is completed and when said merging the contents of the second web page into the first document is completed, the first digital content comprises the second digital content and the third digital content.

26. The method of claim 25, wherein the first document comprises a document compatible with a portable document format.

* * * * *